April 8, 1952 — L. A. BEAN — 2,592,109
REEL SEAT FOR FISHING RODS
Filed May 16, 1950
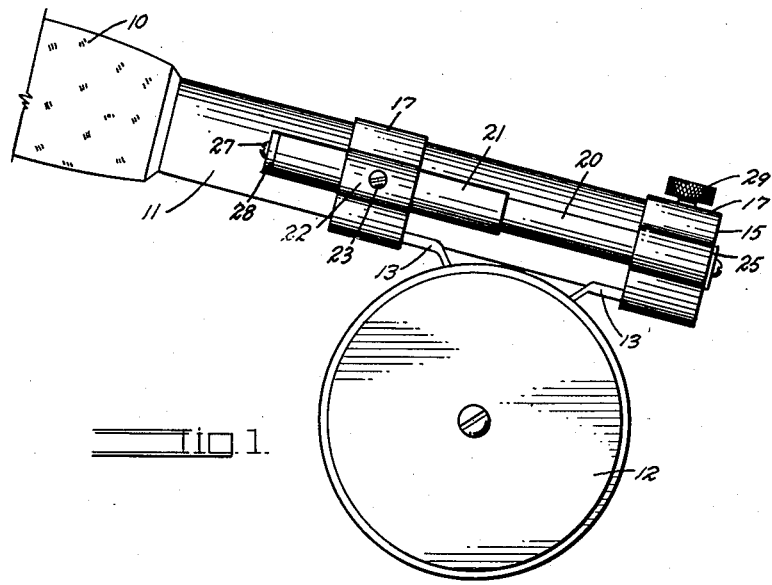
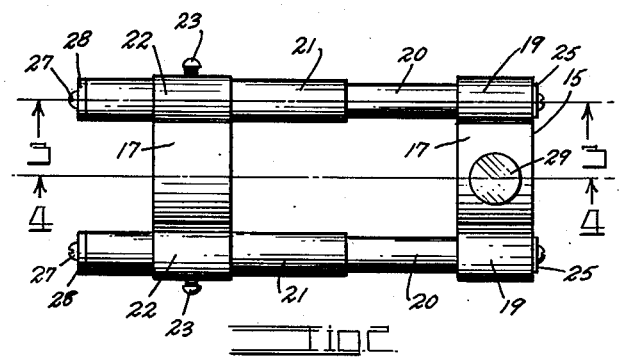
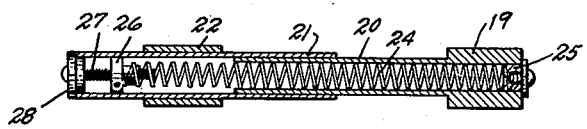
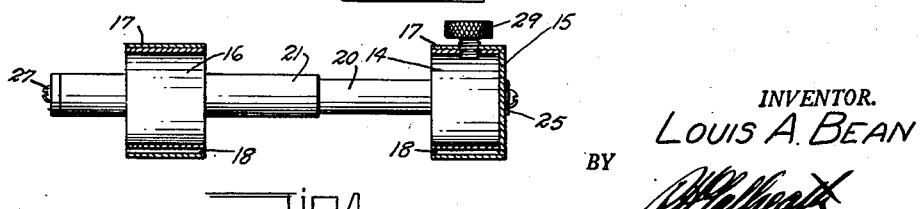
INVENTOR.
LOUIS A. BEAN
BY
ATTORNEY Patented Apr. 8, 1952

2,592,109

UNITED STATES PATENT OFFICE 2,592,109

REEL SEAT FOR FISHING RODS

Louis A. Bean, Indian Hills, Colo.

Application May 16, 1950, Serial No. 162,270

1 Claim. (Cl. 43—22)

This invention relates to a reel holder for attaching a line reel to a fishing rod, and has for its principal object the provision of a simple and highly efficient device which can be quickly and easily applied to any fishing rod, and which will automatically accommodate reels of any standard size without adjustment.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved reel, illustrating it in place on a conventional fishing rod;

Fig. 2 is a top view of the improved reel holder removed from the rod; and

Figs. 3 and 4 are longitudinal sections therethrough, taken on the lines 3—3 and 4—4, respectively, Fig. 2.

In Fig. 1 the handle of a conventional fishing rod is indicated at 10, with the reel seat portion thereof at 11. A conventional line reel is illustrated at 12, with its supporting saddle at 13.

The improved reel holder consists of a rear cup member 14, having a closed bottom 15, and a forward sliding sleeve member 16. The cup member 14 and the sleeve member 16 are both provided with outer straps 17 which, at the bottom of each, are spaced away to provide sockets 18 for receiving the extremities of the reel saddle 13. The members 14 and 16 are soldered or otherwise permanently secured to their straps 17.

The cup member 14 is formed with two oppositely projecting bosses 19 from each of which a spring tube 20 projects. The spring tubes 20 are telescopically received in outer tubes 21 which pass through cylindrical ears 22 formed on the opposite sides of the sleeve member 16. The sleeve members 16 can be set in any desired position along the tubes 21 by means of suitable set screws 23.

A tension spring 24 is positioned within each pair of telescoping tubes 20 and 21. The springs are attached to rear spring plugs 25 and forward spring plugs 26. The rear spring plugs 25 are flanged and bear against the rear extremities of the bosses 19. The forward spring plugs are slidable within the outer tubes 21 and are tapped to receive threaded adjusting screws 27 which extend through head discs 28 on the end of the cups 21. By rotating the screws 27 the tension in the springs 24 can be increased or decreased, as desired.

The device is applied to the rod by simply slipping the sleeve 17 over the reel seat portion 11, and then slipping the cup 14 over the end of the reel seat, where it is locked in place by means of a clamp screw 29.

To attach the reel, it is only necessary to force the sleeve 16 forwardly, thence place the reel yoke 13 between the members 14 and 16, allowing the springs 24 to draw the sleeve 16 rearwardly, causing the sockets 18 to slide over the extremities of the saddle 13. The reel can be instantly removed by simply forcing the sleeve 16 forwardly.

To accommodate the holder to large reels, the set screws 23 are loosened and the member 16 is set further forward. For smaller reels, the member 16 is set further rearward. After the proper adjustment has been made and the screws 23 are tightened, no further adjustments are necessary.

While two of the springs 24 and two of the telescoping members 20—21 have been illustrated, it is conceivable that this device would be operable with only one spring and one telescoping member. Such a construction, would, however, not be as efficient but could be manufactured more economically.

Should it be found that the reel is not being gripped sufficiently tight, it is only necessary to tighten the screws 27 to increase the tension in the springs 24.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

A device for securing a fishing reel of the type having oppositely projecting saddle extremities to a fishing rod, comprising: a slidable sleeve mounted on said rod; a fixed sleeve mounted on said rod, said sleeves having sockets for receiving the saddle extremities of said reel; a projecting boss formed on each sleeve; an inner telescoping tube projecting from the boss on one sleeve; an outer telescoping tube projecting from the boss on the other sleeve over the first tube; and a spring positioned in said tubes and connected therewith and acting to urge said sleeves toward each other.

LOUIS A. BEAN.

REFERENCES CITED

The following references are of record in the file of this patent:

UNITED STATES PATENTS

| Number | Name | Date |
|---|---|---|
| 331,380 | Divine | Dec. 1, 1885 |
| 1,757,311 | Kahle | May 6, 1930 |
| 1,811,403 | Mesinger | June 23, 1931 |
| 1,902,749 | Baird | Mar. 21, 1933 |
| 2,111,080 | Stromgren | Mar. 15, 1938 |